(12) United States Patent
Ivankovic (10) Patent No.: US 7,367,912 B2
(45) Date of Patent: May 6, 2008

(54) COUNTER-ROTATION DRIVE

(75) Inventor: Marko Ivankovic, 1516 N. Beach St., Ormond Beach, FL (US) 32174

(73) Assignee: Marko Ivankovic (RS)

( * ) Notice: Subject to any disclaimer, the term of this patent is extended or adjusted under 35 U.S.C. 154(b) by 278 days.

(21) Appl. No.: 11/337,519

(22) Filed: Jan. 24, 2006

(65) Prior Publication Data

US 2006/0171799 A1    Aug. 3, 2006

Related U.S. Application Data

(60) Provisional application No. 60/648,281, filed on Jan. 31, 2005.

(51) Int. Cl.
*F16H 3/70* (2006.01)
*F16H 1/32* (2006.01)

(52) U.S. Cl. ...................... 475/178; 475/170

(58) Field of Classification Search ........ 475/169–170, 475/172, 178
See application file for complete search history.

(56) References Cited

U.S. PATENT DOCUMENTS 2,037,745 A    4/1936  Vaughn

| | | | | |
|---|---|---|---|---|
| 4,452,102 A | * | 6/1984 | Shaffer | 475/169 |
| 4,526,064 A | * | 7/1985 | Carden et al. | 475/167 |
| 4,642,059 A | | 2/1987 | Nohara | |
| 4,963,108 A | | 10/1990 | Koda et al. | |
| 5,071,393 A | * | 12/1991 | Genovese | 475/166 |
| 5,954,615 A | * | 9/1999 | Folino | 476/36 |

* cited by examiner

*Primary Examiner*—Tisha Lewis (57) ABSTRACT

The mechanical counter-rotation drive according to the present invention is based on the laws of relative motion of an eccentric part of one of at least two shafts, which are constitutive parts of this drive, with respect to the plates of a determined shape whose motion is confined by pins arranged in a determined arrangement, is illustrated in FIG. 1, where in the housing 10 which supports the mechanical counter-rotation drive are accommodated the first (driving) plate 30 and the second (driven) plate 40 in such a manner that they are approximately or completely parallel to one another. In the housing 10 are embedded a plurality of pins 20 of which each one represents a shaft which bears and around which rotates at least one cylinder 35 which is in operational contact with the perimeter 135 of the first plate 30 which is in rigid contact with the first shaft 50 (which shaft is not visible in FIG. 1). In the first plate 30 are embedded a plurality of second pins 80 of which each one represents a shaft which bears and around which rotates at least one cylinder 85 which is in operational contact with the perimeter 145 of the second plate 40.

28 Claims, 5 Drawing Sheets

COUNTER-ROTATION DRIVE

CROSS REFERENCE TO RELATED APPLICATION

This application is the non-provisional patent application of provisional patent application No. 60/648,281 filed on Jan. 31, 2005, and claims priority therefrom and is incorporated in its entirety.

FIELD OF THE INVENTION

The present invention relates generally to transmission systems, and more particularly to transmission systems with rotating plates capable of producing counter-rotation between two inline shafts.

BACKGROUND OF THE INVENTION

Counter-rotation is used in mechanisms which require reversing the angular direction of rotation, in cases in which it is necessary for the driving shaft to rotate in one angular direction, and the other shaft, which is driven by the driving shaft, to rotate in the opposite angular direction. Such forms of transmission are used in helicopter drives, differential transmissions in vehicles, propeller driven marine vessels, turbine engines, turbo-generators, and compressors, to name a few.

Solving the problem of mechanical counter-rotation with a transmission ratio of 1 to 1 and shafts aligned along a common rotational axis is exclusively confined to types of planetary gear transmissions and transmission of torque via gears. The transmission ratio 1 to 1 (1:1) means that an angular displacement at one end of a device is transmitted by the device so that exactly the same angular displacement is produced at the other end of the same device. For example, a solution with a double propeller helicopter with a common axis by S. P. Vaughn (U.S. Pat. No. 2,037,745) where counter-rotation of two propeller systems is used to provide a more stable flight and facilitate the control of the helicopter. A solution with a counter-rotating double propeller system (U.S. Pat. No. 4,642,059) is used for a marine drive, in which case an inner shaft is at one end directly coupled to an outer hollow drive shaft. Another patent (U.S. Pat. No. 4,963,108) describes a system for counter-rotation comprising a propeller with a large gear driven by an engine, with which gear a plurality of smaller gears are in operational contact at its perimeter, so that counter-rotation of the second, driven, shaft is obtained. The known solutions which use planetary geared transmission are cumbersome, with significant losses to friction, accompanied by common problems of wear and low efficiency, due to gaps that cannot be avoided in such solutions. These solutions are also known to produce clattering and loud noise resulting from the existence of the gaps. Such transmission systems also have a low degree of safety of operation, and are known to lack a constant torque at each point. Also, in solutions with planetary gears, the load is unevenly distributed; in most cases concentrated at one point (the point of immediate contact of the driving and driven parts of the assembly). This uneven load distribution creates critical elements in the assembly and requires excessively large parts to provide the necessary safety margins.

The problem of obtaining counter-rotation of coupled shafts with a transmission ratio of 1:1 and shafts aligned along the same rotational axis in the manner disclosed here has not been observed in any other solution known in prior art.

SUMMARY OF THE INVENTION

The invention disclosed herein is a mechanical counter-rotation drive, comprising a support structure that remains stationary with respect to the mechanical drive and providing a structural point of attachment for the mechanical drive, a first driving shaft that provides a drive torque having an eccentric portion and rotating in a first angular direction of rotation, a second shaft, having a same axis of rotation as the first shaft, functioning as a driven shaft and rotating in a second angular direction of rotation that is opposite to the first angular direction of rotation, a first plate having a plurality of lobes and operationally connected with the eccentric portion of the first driving shaft and having a center that is not aligned with the axis of rotation of the first and second shafts and rotates eccentrically with respect to the axis of rotation, a plurality of first pins operationally connected to the support structure and arranged such that a portion of a perimeter of the first plate is in rolling contact with the first pins and such that the arrangement causes the first plate to rotate in the second angular direction of rotation, a plurality of second pins that are operationally connected to the first plate or are constitutive parts of the first plate, and a second plate having a plurality of lobes and operationally connected with the first plate in such a way that a portion of a perimeter of the second plate is in rolling contact with the second pins of the first plate producing a rotation of the second plate in the second angular direction of rotation, wherein the second shaft is operationally connected to the second plate or is a constitutive part of the second plate, and is driven by the second plate.

The present invention also relates to a mechanical counter-rotation drive, which provides mechanical counter-rotation of shafts coupled by the invention with a transmission ratio of 1:1 and aligned along a common rotational axis without planetary transmission elements, whereas in alternate embodiments of the invention it is possible to realize transmission ratios other than 1:1. The basic embodiment of the invention is the realization of a mechanism for reversing the angular direction of rotation between two inline shafts such that the two shafts will rotate with angular directions of rotation that are opposite to each other, and the two shafts share a common rotational axis. The present invention can generally be used for reversing of the angular direction of rotation of inline shafts with a common axis, and particularly in combustion gas turbine engines, turbine engines in general, torque transmissions to propellers, helicopter drives, marine drives, differential transmissions, land vehicles, robotics, and the like.

BRIEF DESCRIPTION OF THE DRAWINGS

The above-mentioned and other concepts of the present invention will now be described with reference to the accompanying drawings of the preferred embodiment of the present invention. The presented embodiment is intended to illustrate the application, but not to limit the invention. The drawings contain the following figures, in which like numbers refer to like parts throughout the description and drawings and wherein.

DETAILED DESCRIPTION OF THE INVENTION

The counter-rotating drive described herein employs some basic concepts. For example, in its broadest concept, the counter-rotation drive reverses the direction of rotation of a driven shaft associated with a drive shaft. Another concept relates to a nested counter-rotating drive configuration, having a drive shaft arranged within a driven shaft. Another concept relates to a counter-rotation drive adapted to minimize the vibration experienced during operation via a configuration that is counter-balanced.

The present invention is disclosed in context of use as a counter-rotation drive for use in any combustion turbine engine. For example, the number of rows of rotating airfoil blades and stationary airfoil vanes in the compressor or turbine sections of a typical combustion turbine engine can be reduced by incorporating the counter-rotation drive. However, the principles of the counter-rotation drive are not limited to use in a combustion turbine engine. The counter-rotation drive can be used in any application where reversing the direction of rotation of a driven shaft associated with a drive shaft is applicable. Examples of such applications include marine drives, turbojets, turbofans, turboshafts, helicopter rotor systems, transmission systems, and geared reduction systems just to name a few. Such systems are commonly used in the transportation industry, aerospace industry, petroleum industry, and many household appliances.

While the counter-rotation drive is disclosed in context of use as a drive system, it is not limited to use as a drive system. The counter-rotation drive may be used as a reduction system as well. One skilled in the art may find different applications, processes, configurations, and methods for the counter-rotation drive disclosed herein. Thus, the illustration and description of the present invention in context of use as a counter-rotation drive is merely one possible application of the present invention. However, the present invention has particular applicability for use as a counter-rotation drive in a combustion turbine compressor.

Figure 1:
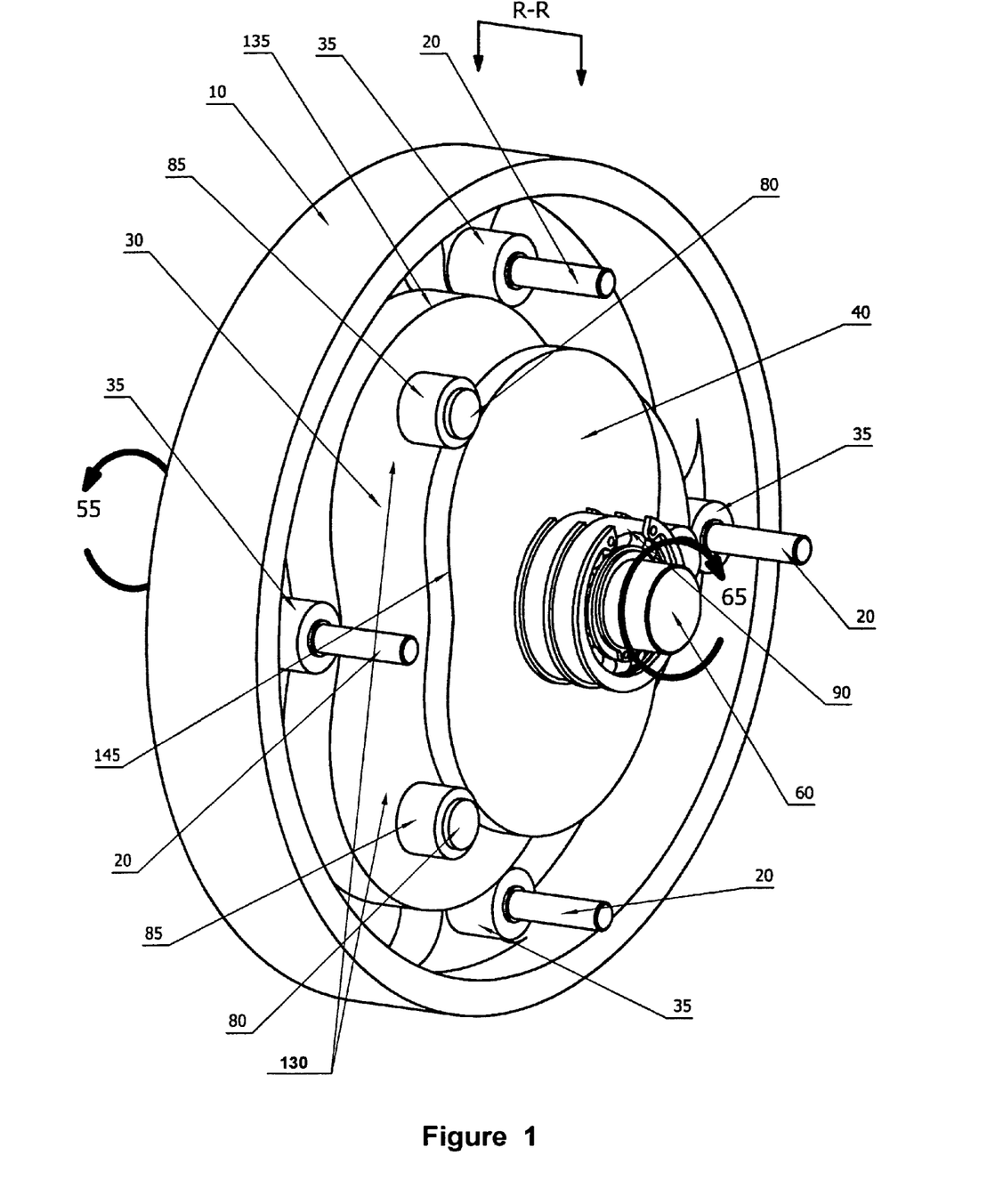
FIG. 1 is a perspective view of the counter-rotation drive according to the invention in which part of the housing has been removed.

A mechanical counter-rotation drive (CRD) according to the present invention is illustrated in FIG. 1, in which the housing 10 which supports the whole CRD accommodates the first (driving) plate 30 and the second (driven) plate 40 in such a manner that they are approximately or completely parallel to one another. In the housing 10 are embedded a plurality of pins 20 of which each pin represents an axis which supports and around which rotates at least one cylinder 35 which is in operational contact with the perimeter 135 of the first plate 30 and which is in contact with the first shaft 50 (which shaft is not visible in FIG. 1). In the first plate 30 are embedded a plurality of second pins 80 of which each pin represents an axis which supports and around which rotates at least one cylinder 85 which is in operational contact with the perimeter 145 of the second plate 40. Ball bearings 90 act as a rolling/sliding support for the second shaft 60 in the part 10a of the housing 10, which part is in this case removed in order to allow the view of the design of the CRD according to the invention inside the housing 10. In the preferred embodiment the sliding support of the first shaft 50 in the housing 10 and/or the second shaft 60 in the part of the housing 10a is realized by ball bearings 90, but the sliding support can be realized by using other sliding or rolling elements and/or sliding or rolling surfaces. The axis of rotation 56 (FIG. 2) of the first shaft 50, which is not visible in FIG. 1, belongs approximately or exactly to the same line as the axis of rotation 66 (FIG. 2) of the second shaft 60, and the angular direction of rotation of the first shaft 50 is the first direction 55, while the angular direction of rotation of the second shaft 60 is the second direction of rotation 65, such that the two angular directions of rotation 55 and 65 are opposite to each other.

Figure 2:
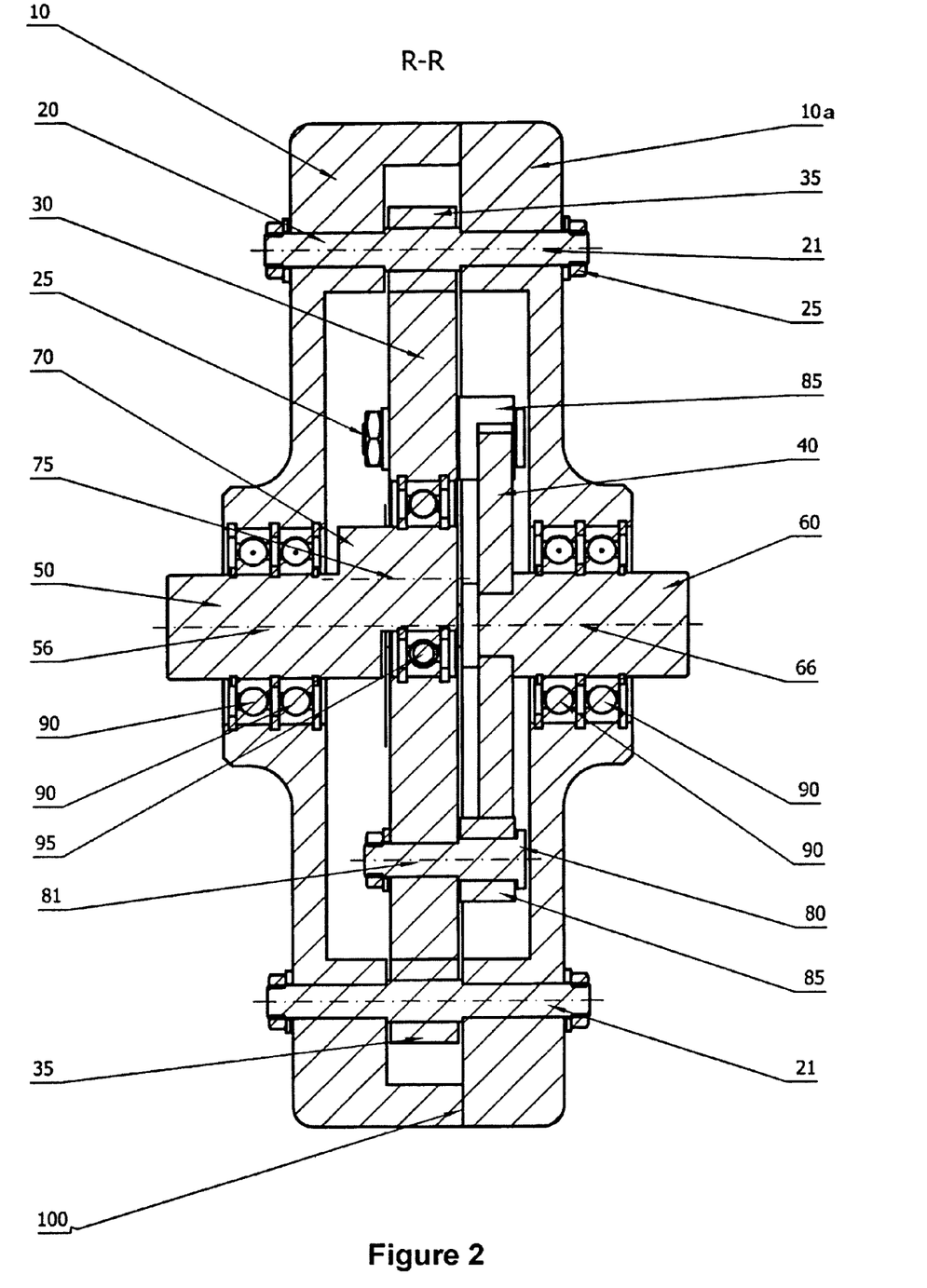
FIG. 2 is a cross-sectional view of the counter-rotation drive along the R-R section as marked in FIG. 1.

Referring to FIG. 2 which illustrates the R-R cross-section marked in FIG. 1, but in a complete and closed housing 10, in which both parts of the housing 10 and 10a are joined together at the interface 100, the CRD according to the invention comprises the first shaft 50 which rotates in the first angular direction 55 around the axis of rotation 56 which approximately or exactly lies on the same line as the axis of rotation 66 of the second shaft 60 which rotates in the second angular direction of rotation 65. The first shaft 50 comprises an eccentric part 70 or is in contact with the eccentric part 70, such that the axis 75 of the eccentric part 70 is eccentrically offset with respect to the axis of rotation 56 of the first shaft 50. The eccentric part 70 is supported in the first plate 30 via ball bearings 95, instead of which bearings other rolling or sliding elements and/or surfaces can be used.

Referring to FIGS. 1 and 2, the first (driving) shaft 50 which rotates in the first angular direction 55 comprises an eccentric part 70 which is operationally connected to the first plate 30. The first plate 30 moves within a space confined by a set of pins 20 in such a way that a portion of the surface of the perimeter 135 of the first plate 30 with lobes 130 and recesses between the lobes 130 will move over the surfaces of the cylinders 35 on pins 20, so that the rotation of the driving shaft 50 in the first angular direction 55, due to the eccentric part 70, will produce a revolution of axis 75 around axis 56, whereby the center of the first plate 30 will also move around the axis 56, and the movement of the lobes 130, or recesses between the lobes 130, over the surfaces of the rotating cylinders 35 on pins 20 will produce rotational motion of the first plate 30 in the second angular direction 65. The first angular direction of rotation 55 and the second angular direction of rotation 65 are opposite to one another. For example, if the first angular direction of rotation 55 is in the clockwise direction, the second angular direction of rotation 65 will be in the counter-clockwise direction. The first plate 30 is operationally coupled with the second plate 40 via the second pins 80 and causes the second plate 40 to move in the same angular direction of rotation as the first plate 30, which in this case is the second angular direction of rotation 65. The driven shaft 60 is connected to the second plate 40 and provides the output torque. The first pins 20 can be placed within the housing 10 or within another operational space of another assembly that is adapted and stationary with respect to the housing 10. The axes 21 of the first pins 20 may be approximately perpendicular to the axes about which the first plate 30 and the second plate 40 rotate.

Figure 3:
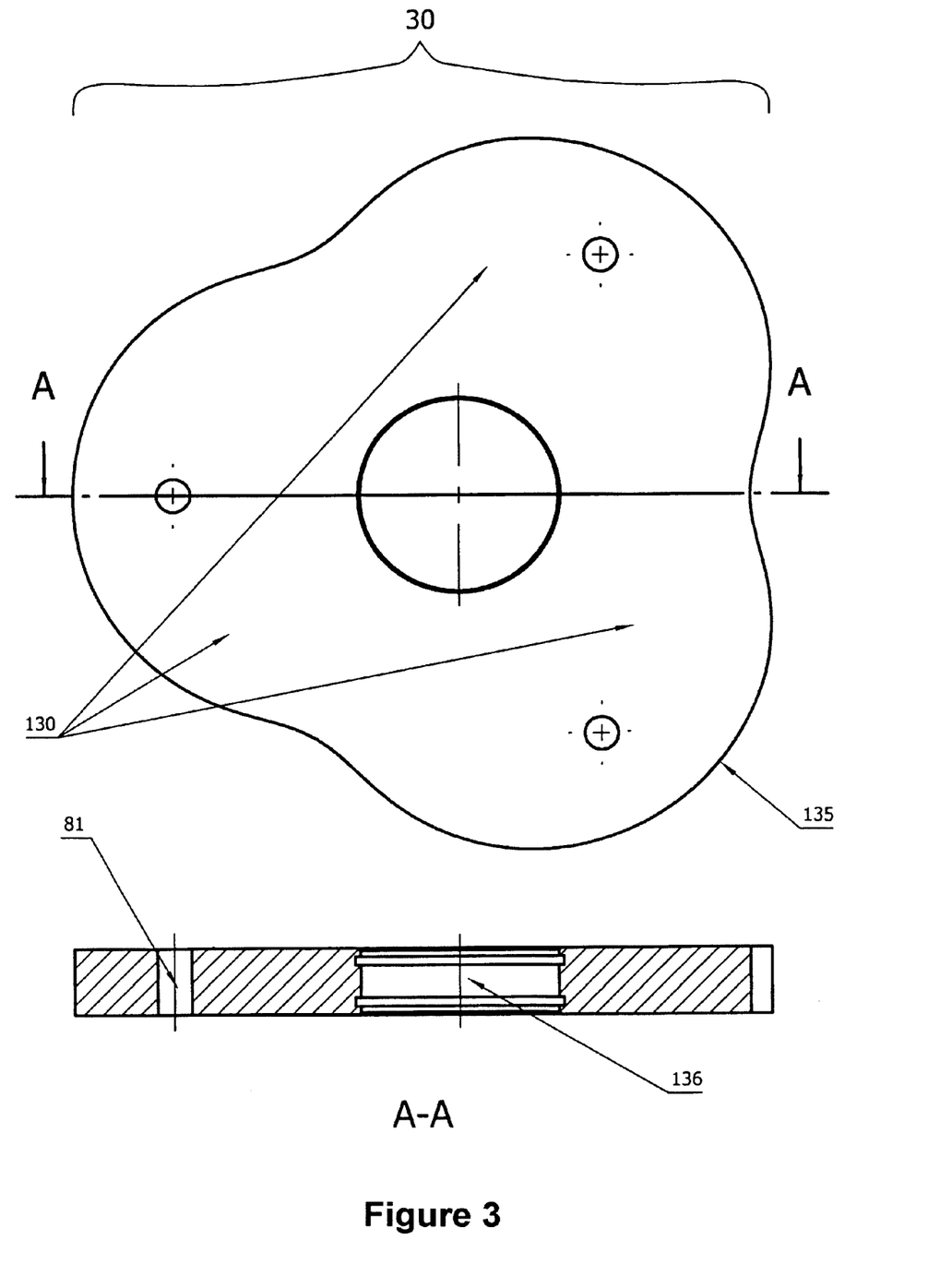
FIG. 3 is an illustration of a typical first (driving) plate as applied in the preferred embodiment illustrated in FIG. 1.

FIG. 3 is a representation of the first (driving) plate 30. It is represented here as a plate with three lobes 130 (or, alternatively three recesses between the lobes 130) which are at a distance from the center 136 of the plate 30. Each lobe 130 occupies an angular region defined here as the domain of the lobe, limited by the points of deflection in the shape of the perimeter 135 which points divide the shape of the first plate 30 into lobes and recesses and divides the whole first plate 30 into domains of lobes and domains of recesses. However, the first plate 30 can have more or less lobes 130 and/or recesses. The first plate 30 has such a shape that a portion of the surface of the perimeter 135 of the first plate 30 is in contact with pins 20 via their rotating cylinders 35 supported in the housing 10, 10a (see FIG. 2), although generally it is not required for the first plate 30 to be in constant contact with all pins 20 and/or cylinders 35 of the rolling/sliding elements. The shape of the perimeter 135 of the first plate 30 is not arbitrary, but is determined by trigonometric functions that cause the lobes 130 of the first plate 30 to be in contact with the cylinders 35 of the first pins 20 (see FIG. 1 and FIG. 2). The motion of the first plate 30 is achieved by the rotation of shaft 50 with the eccentric part 70, supported in the housing 10 and in the center or approximate center 136 of the first plate 30. The first plate 30 is operationally connected with the first driving shaft 50 via its eccentric part 70 which has an axis 75 (see FIG. 2). The eccentric part 70 is supported in the center or approximate center 136 of the first plate 30. It is not required for the eccentric part 70 of the first shaft 50 to be operationally connected with the first plate 30 approximately in the centre of the first plate 30, but it is preferred. The eccentric part 70 with axis 75 (see FIG. 2) may be designed and configured to be coupled with the first driving plate 30. The size and thickness of the first plate 30 depends on the application. However, the size and thickness of the first plate 30 may vary depending on other mechanical considerations such as the magnitude of the drive torque. For example, in an application where a larger torque is applied, it may be required that the first plate 30 be of larger size and/or thickness than if a smaller torque is applied.

Figure 4:
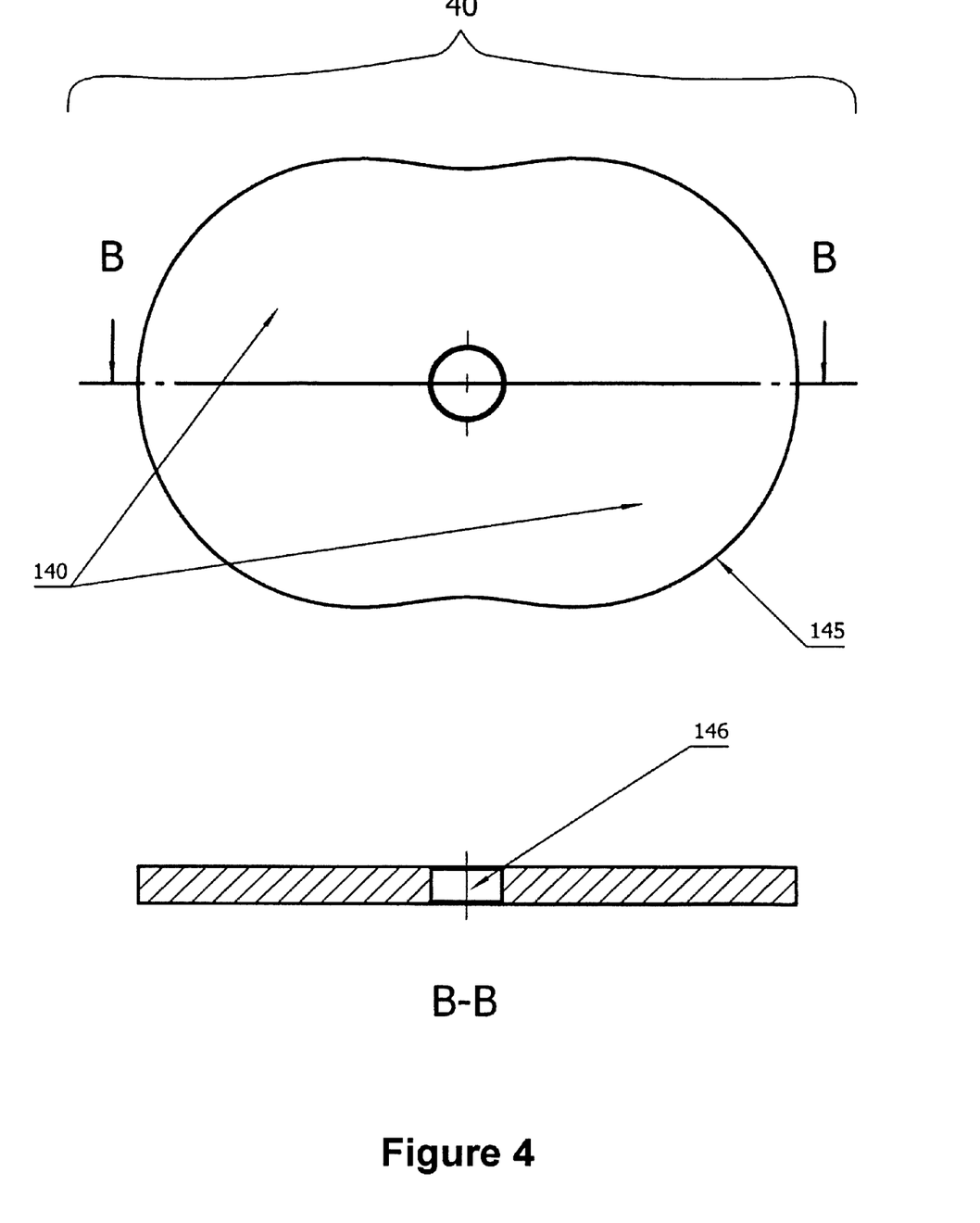
FIG. 4 is an illustration of a typical second (driven) plate as applied in the preferred embodiment illustrated in FIG. 1.

FIG. 4 is an illustration of a typical second plate 40 with two lobes 140 at a distance from the center 146 of the second plate 40. Generally the second plate 40 can have more lobes 140. The second plate 40 has a perimeter 145 such that during motion a portion of the surface of the perimeter 145 remains in contact with the rotating cylinders 85 of the second pins 80 of the first plate 30, although it is not a general requirement that the second plate 40 be in constant contact with all the pins 80 and/or cylinders 85 of the rolling/sliding elements (see FIG. 1 and FIG. 2). The shape of the perimeter 145 is not arbitrary, but is determined by trigonometric functions that cause the lobes 140 of the second plate 40 to be in contact with the cylinders 85 of the second pins 80 of the first plate 30 (see FIG. 1 and FIG. 2).

The first plate 30 and the second plate 40 can be constructed and produced by any suitable method known to a person skilled in the art, from any suitable material such as metal, wood, plastic, composites, alloys, ceramics, or any existing material in solid form. Selection of the first plate 30 and second plate 40 material should be commensurate with the particular application. However, it is not required that the material selection for first plate 30 and second plate 40 be commensurate with the particular application, but may be selected based on economic considerations such as cheapest to produce. Furthermore, the first plate 30 and the second plate 40 are not required to be constructed of the same material. Plates may have additional holes, lobes, incisions, notches and any other elements of shape. It is also anticipated, in other embodiments, to add a second first plate and a second eccentric part of the drive shaft 50 in such a way that these two first plates have a different mass distribution and reduce vibrations that are the result of the possibly uneven mass distribution of a single first plate 30.

Figure 5:
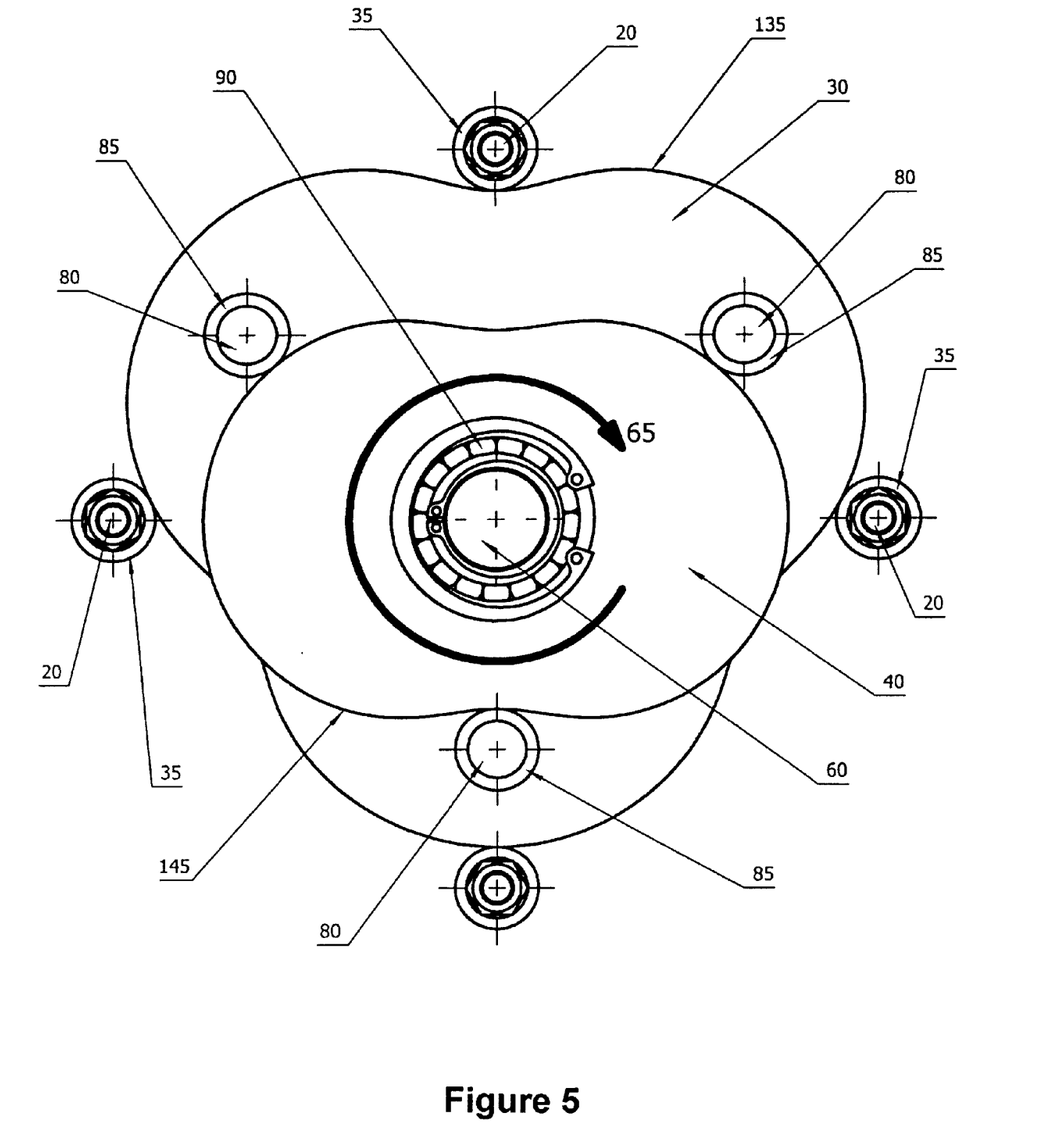
FIG. 5 is a representation of the core assembly of the first plate and the second plate with their typical accessories as applied in the preferred embodiment illustrated in FIG. 1.

In FIG. 5 the first plate 30 is illustrated as a plate with three lobes 130, and the second plate 40 with two lobes 140.

The first pins 20 which are supported in the housing 10 (see FIG. 2) are in a rolling/sliding contact with a portion of the surface of the perimeter 135 of the first plate 30 via the rotating cylinders 35. The second pins 80, which are in this case supported in the first plate 30 are in a rolling/sliding contact with a portion of the surface of the perimeter 145 of the second plate 40 via the rotating cylinders 85. It is preferred that each of the second pins 80 be placed in the domains of the lobes 130 of the first plate 30 (see FIG. 3) although they can be placed in the domain of the recesses if required. Each of the second pins 80 is placed at a determined distance from the center 136 of the first plate 30. The number of lobes 130 of the first plate 30 is not arbitrary. The number of lobes 130 will affect the reduction or increase of the speed of rotation of the second shaft 60. The positions of the second pins 80 are a function of the shape of the perimeter 145.

The first (driving) shaft 50 is supported via the bearings 90 in the housing 10, or within some other assembly, and has an axis of rotation 56. If required, more than one set of bearings 90 can be used to support of the shaft 50. The first plate 30 comprises a plurality of second pins 80 whose axes 81 are approximately or exactly parallel to axes 21 of the first pins 20. Although this is not a general requirement, the outer surfaces of the rotating cylinders 35 and 85 may be approximately or exactly parallel to the surfaces of the perimeters 135 and 145. It is advantageous that the first pins 20 and the second pins 80 be fixed by screws 25. However, this is not a general requirement and other solutions are also applicable. The second (driven) shaft 60, whose axis of rotation is axis 66, is operationally coupled to the second plate 40. However, this is not a general requirement, since the second shaft 60 and the second plate 40 can be made out of a single piece of material, for example. The second shaft 60 is supported in the bearings 90 mounted within the housing 10 or within some other assembly. The axis of rotation 56 of the driving shaft 50 and the axis of rotation 66 of the driven shaft 60 are approximately inline and remain so during operation.

The magnitude and direction of the rotational speed of the first plate 30 depend on the shape of its perimeter 135, number of lobes 130, number of pins 20 supported in the housing 10, the eccentric part 70, and is determined by trigonometric functions that cause the cylinders 35 of the first pins 20 to impinge on the lobes 130 of the first plate 30, thereby rotating the first plate 30 in the desired direction. The rotation of the second plate 40 is produced by the transmission of the rotation of the first plate 30 via the second pins 80 to the second plate 40. The angular speed of rotation of the second plate 40 can be different from the angular speed of rotation of the first plate 30. The magnitude and direction of the rotational speed of the second plate 40 is determined by the number of lobes 130 of the first plate 30, the number of lobes 140 of the second plate 40, the shape of the perimeter 135 of the first plate 30 and the shape of the perimeter 145 of the second plate 40. The principle relationships of these elements can be derived from the translational-rotational motion of a cycloid along a hypocycloid or epicycloid with a predetermined eccentric offset and a predetermined diameter of the circle that produces the cycloid, such that using the same eccentric offset for defining the output, a resulting transmission ratio of rotational motion is obtained, which ratio can be 1 to 1 (1:1) or other ratios, depending on the parameters and the housing-pins environment of the cycloid. All the necessary functional relationships are derived from the set of relevant trigonometric functions (1) where the first pair is used for defining the shapes of the plates and the second pair is used for obtaining the pin positions:

$$X=(Ra+Rb)\cdot\cos(\alpha)+Ra\cdot\cos(\alpha+\beta)$$

$$Y=(Ra+Rb)\cdot\sin(\alpha)+Ra\cdot\sin(\alpha+\beta)$$

$$X=(Rb-Ra)\cdot\cos(\alpha)+Ra\cdot\cos(\beta-\alpha)$$

$$Y=(Rb-Ra)\cdot\sin(\alpha)+Ra\cdot\sin(\beta+\alpha)$$

where $\alpha$ is the angle defining the position of the center of a moving cylinder (Ra) with respect to the center of a fixed cylinder (Rb), and $\beta$ is the angle defining the angular position of a fixed point on a moving cylinder (Ra) with respect to the center of the moving cylinder and relative to the center of a fixed cylinder (Rb).

It is not required that each lobe 130 comprise a second pin 80 placed in the domain of the lobe 130. The embodiment described produces rotation of the first plate 30 in the opposite angular direction of rotation 65 from the angular direction of rotation 55 of the first shaft 50. The location of the first pins 20 and the shape of the perimeter 135 of the first plate 30, particularly of lobes 130, aid in obtaining counter-rotation. In addition, the magnitude of the distance of the center 136 of the first plate 30 from the center of rotation 56 of the first shaft 50, i.e. the length of the eccentric part 70, is the variable that affects the trigonometric function which defines the shape of the perimeter 135 of the first plate 30.

It is important to note that the driving plate can be either the first plate 30 or the second plate 40, but the present description only deals with the case in which the drive plate is the first plate 30, for simplicity. In the same way, the driving shaft can be either shaft 50 or shaft 60. In other words, the part of the assembly which is functionally the driving part in one embodiment can in another embodiment be functionally the driven part and vice versa. This applies to all descriptions and examples in further text.

In yet another embodiment, the same principles provide a solution which effectively comprises two basic embodiments described above joined into one, in such a way that it includes two first plates 30 and two eccentric parts 70, and the second plates 40 are joined into one part, and the counter-rotation is transferred by a connection outside the housing 10 to a disk which rotates in the opposite angular direction 65 with respect to the first shaft 50, which shaft 50 in such an embodiment extends through the assembly. This embodiment is intended to enhance operational balance of the assembly.

In yet another embodiment the same principles provide a solution which effectively comprises two basic embodiments described above joined into one, in such a way that the second shaft 60 has a larger diameter than the first shaft 50 and is hollow, so that the first shaft 50 extends through the assembly and has the same axis of rotation 56 as the second shaft 60, which causes the counter-rotation of the second shaft 60 around the first shaft 50 which in such an embodiment extends through the assembly.

In yet another embodiment, combining and pairing of the plates (driving and driven, i.e. the first plate 30 and the second plate 40) it is also possible to achieve various transmission ratios. For example, if the first plate 30 is made with 6 lobes 130 and the second plate 40 with 4 lobes 140, with the same conditions as in the above described embodiments, a transmission ratio different from 1:1 is achieved. Also, if the same plates are used for achieving the transmission ratio of 1:1, but with different conditions such as the number of first pins 20 in the housing 10 and the length of the eccentric part 70 of the first shaft 50, then a transmission ratio different from 1:1 is achieved. By adding one more first plate 30 and pairing in such a way that a sequence first 30—second 40—first 30 plate is obtained, the transmission ratio of 1:1 is maintained, but the first and the last shaft in this sequence rotate in the same angular direction of rotation.

In yet another embodiment, the present invention is used in the compressor of a combustion gas turbine engine such that the compressor comprises a plurality of stages consisting of stationary and rotating airfoils, such that a rotating row of airfoils rotates in a direction opposite an adjacent rotating row of airfoils. In such an embodiment, it is possible for the adjacent rows of rotating airfoils to rotate at different rates. This application of the CRD according to the present invention will reduce the stage count in the compressor section of a typical combustion turbine engine.

In other embodiments, the CRD can be applied in any design with drive shafts, such as marine propeller drives, helicopter propeller drives, automotive applications, and home appliances, to name a few. In such applications the CRD according to the invention would provide counter-rotation in addition to varying the transmission ratio.

Furthermore, other embodiments of the CRD according to the invention are possible in turbo-propulsion engines, turbo-shaft engines, turbo-fan engines, other turbine engines, in differential transmissions in cars and other land vehicles, submarine and marine drive systems, and robotics to name a few.

Furthermore, while the CRD is disclosed here in the context of application as a drive system, it is not limited to applications as a drive system. The CRD according to the invention can also be used as a reduction system. A person skilled in the art can find other applications, processes, configurations, and methods for the CRD hereby disclosed. Because of that, the illustration and description of the present invention in the context of application as a counter-rotating drive is only one of many possible applications of the present invention.

EXAMPLES

The following examples are provided and serve as illustration of possible embodiments of the present invention and are not intended to limit the scope of the invention in any way.

Example 1

An embodiment of the CRD is illustrated in FIGS. I through 5 in which the rotation in the first angular direction 55 of the first (driving) shaft 50 with its eccentric part 70 drives the first (driving) plate 30 that exercises translational motion while rotating between pins 20 which are placed within the housing 10 of the CRD and which force the first plate 30 to move along a determined path, and moves the second pins 80 that are placed on the first plate 30, and which drive the second (driven) plate 40. Counter-rotation is achieved as a result of the motion of the eccentric part 70 which forces the first plate 30 to rotate in the opposite angular direction 65 from the first angular direction 55 of the first shaft 50, due to the arrangement of the first pins 20 in the housing 10 and the shape of the perimeter 135 of the first plate 30.

A physical model was made according to this embodiment, which model is easily driven by hand, and allowed measurement of the transmission, which was 1:1 in this case.

The model dimensions are: diameter 350 mm, both shafts diameter 25 mm, eccentric offset of the eccentric part of the shaft 11.25 mm.

Example 2

According to the embodiment of the present invention with a transmission ratio of 1:1 a physical model was made of metal, with similar basic dimensions as in Example 1. This metal model was used to test the possibility of achieving high rotational speeds. The model reached speeds in excess of 100,000 RPM (one hundred thousand revolutions per minute). The test confirmed that the overall friction in this embodiment originates from the bearings while rolling, and the heat generated is associated with the bearings and their motion.

This model was also tested for mechanical breakdown and proved to be mechanically robust and had a safety factor higher than that of classical gear transmission devices.

While the invention has been described in connection with what is presently considered to be the preferred embodiments, it is to be understood that its modifications, equivalents, and variations will be obvious, without changing the essence of the invention, to persons skilled in the art upon learning the essence of the invention from its description disclosed herein. It is therefore the intention of the author for these possible embodiments to be included within the spirit and scope of the appended patent claims.

What is claimed is:

1. A mechanical counter-rotation drive, comprising:
   a support structure that remains stationary with respect to the mechanical drive and providing a structural point of attachment for the mechanical drive;
   a first driving shaft that provides a drive torque having an eccentric portion and rotating in a first angular direction of rotation;
   a second shaft, having a same axis of rotation as the first shaft, functioning as a driven shaft and rotating in a second angular direction of rotation that is opposite to the first angular direction of rotation;
   a first plate having a plurality of lobes and operationally connected with the eccentric portion of the first driving shaft and having a center that is not aligned with the axis of rotation of the first and second shafts and rotates eccentrically with respect to the axis of rotation;
   a plurality of first pins operationally connected to the support structure and arranged such that a portion of a perimeter of the first plate is in rolling contact with the first pins and such that the arrangement causes the first plate to rotate in the second angular direction of rotation;
   a plurality of second pins that are operationally connected to the first plate or are constitutive parts of the first plate; and
   a second plate having a plurality of lobes and operationally connected with the first plate in such a way that a portion of a perimeter of the second plate is in rolling contact with the second pins of the first plate producing a rotation of the second plate in the second angular direction of rotation,
   wherein the second shaft is operationally connected to the second plate or is a constitutive part of the second plate, and is driven by the second plate.

2. The mechanical counter-rotation drive as claimed in claim 1, wherein the first plate is driven by the angular rotation of the eccentric portion of the first shaft such that a portion of the perimeter of the first plate impinges on the plurality of first pins while remaining in rolling or sliding contact with the second pins and causes the first plate to move in the second angular direction of rotation.

3. The mechanical counter-rotation drive as claimed in claim 1, wherein the first and second shafts rotate at the same rotational speed and with opposite angular directions of rotation.

4. The mechanical counter-rotation drive as claimed in claim 1, wherein the first shaft and second shafts rotate at different rotational speeds and with opposite angular directions of rotation.

5. The mechanical counter-rotation drive as claimed in claim 1, wherein the number of lobes on the first plate and the number of lobes on the second plate are the same.

6. The mechanical counter-rotation drive as claimed in claim 1, wherein the number of the lobes on the first plate and the number of lobes on the second plate are not the same.

7. The mechanical counter-rotation drive as claimed in claim 6, wherein the number of lobes on the first plate is 3 and the number of lobes on the second plate is 2.

8. The mechanical counter-rotation drive as claimed in claim 1, wherein the number of lobes on the first plate is functionally related to the number of lobes on the second plate and is functionally related to the number and arrangement of the first pins and is functionally related to the number and arrangement of the second pins.

9. The mechanical counter-rotation drive as claimed in claim 1, wherein the counter-rotation drive further comprises a plurality of cylinders such that each cylinder surrounds a portion of the first pin or a portion of the second pin.

10. The mechanical counter-rotation drive as claimed in claim 9, wherein a portion of the perimeter of the first plate is in rolling or other operational contact with the cylinders surrounding the first pins and a portion of the second plate is in rolling or other operational contact with the cylinders surrounding the second pins.

11. The mechanical counter-rotation drive as claimed in claim 1, wherein the pins have a circular profile.

12. The mechanical counter-rotation drive as claimed in claim 1, wherein the second pins are arranged in domains of the lobes of the first plate and the second pins have a same angular distance from each other, the angular distance referenced with respect to a center of the first plate as a vertex of an angle.

13. The mechanical counter-rotation drive as claimed in claim 1, wherein the rate of rotation of the first plate is different from the rate of rotation of the second plate.

14. The mechanical counter-rotation drive as claimed in claim 1, wherein the mechanical counter-rotation drive has a transmission ratio of 1 to 1.

15. The mechanical counter-rotation drive as claimed in claim 1, wherein the transmission ratio is different than 1 to 1.

16. The mechanical counter-rotation drive as claimed in claim 1, wherein the first driving shaft has a second eccentric portion connected with a second first plate such that the second first plate is adjacent to the first plate and arranged out of phase with the first plate.

17. The mechanical counter-rotation drive as claimed in claim 16, wherein the first plate and the second first plate are in the range of 90° to 270° out of phase.

18. The mechanical counter-rotation drive as claimed in claim 17, wherein the first plate and the second first plate are 180° out of phase.

19. The mechanical counter-rotation drive as claimed in claim 1, wherein the drive torque is applied to the second shaft such that the second shaft is the driving shaft and the first shaft is the driven shaft.

20. The mechanical counter-rotation drive as claimed in claim 1, wherein two counter-rotation drives are joined into one such that the second shaft has a larger diameter than the first shaft and is hollow with the first shaft passing through the second shaft and the first and second shafts share a common rotational axis that causes the second shaft to rotate concentrically about the first shaft, and the first shaft extends through the assembly.

21. The mechanical counter-rotation drive as claimed in claim 1, wherein the counter-rotation drive comprises a second counter rotation drive joined to produce a new counter-rotation drive, such that there are two first plates and two corresponding eccentric portions of the shaft and two second plates are joined into one assembly and counter-rotation is transferred by a rigid connection outside the housing to a disk or cylinder that rotates in an opposite angular direction with respect to the first shaft and the shaft extends through the assembly.

22. A compressor for a gas turbine engine, comprising:
a plurality of stationary compressor blades; and
a plurality of rotating compressor blades,
wherein the rotating compressor blades are operatively connected to a mechanical counter-rotation drive comprising;
a support structure that remains stationary with respect to the mechanical drive and providing a structural point of attachment for the mechanical drive;
a first driving shaft that provides a drive torque having an eccentric portion and rotating in a first angular direction of rotation;
a second shaft, having a same axis of rotation as the first shaft, functioning as a driven shaft and rotating in a second angular direction of rotation that is opposite to the first angular direction of rotation;
a first plate having a plurality of lobes and operationally connected with the eccentric portion of the first driving shaft and having a center that is not aligned with the axis of rotation of the first and second shafts and rotates eccentrically with respect to the axis of rotation;
a plurality of first pins operationally connected to the support structure and arranged such that a portion of a perimeter of the first plate is in rolling contact with the first pins and such that the arrangement causes the first plate to rotate in the second angular direction of rotation;
a plurality of second pins that are operationally connected to the first plate or are constitutive parts of the first plate; and
a second plate having a plurality of lobes and operationally connected with the first plate in such a way that a portion of a perimeter of the second plate is in rolling contact with the second pins of the first plate producing a rotation of the second plate in the second angular direction of rotation, wherein the second shaft is operationally connected to the second plate or is a constitutive part of the second plate, and is driven by the second plate.

23. The compressor as claimed in claim 22, wherein the counter-rotation drive comprises a second counter rotation drive joined to produce a new counter-rotation drive, such that there are two first plates and two corresponding eccentric portions of the shaft and two second plates are joined into one assembly and counter-rotation is transferred by a rigid connection outside the housing to a disk or cylinder that rotates in an opposite angular direction with respect to the first shaft and the shaft extends through the assembly.

24. The compressor as claimed in claim 23, wherein the rotating compressor blades are attached to the disk.

25. The compressor as claimed in claim 24, further comprising a bladed disk not having the counter-rotation drive and arranged adjacent to at least one bladed disk having the counter-rotation drive.

26. The compressor as claimed in claim 22, wherein the magnitude of the angular rotation of the drive torque is reversed with a transmission ratio of 1 to 1.

27. The compressor as claimed in claim 22, wherein the magnitude of the angular rotation of the drive torque is reversed with a transmission ratio different from 1 to 1.

28. The compressor as claimed in claim 22, wherein two counter-rotation drives are joined into one such that the second shaft has a larger diameter than the first shaft and is hollow with the first shaft passing through the second shaft and the first and second shafts share a common rotational axis that causes the second shaft to rotate concentrically about the first shaft, and the first shaft extends through the assembly.

* * * * *